March 5, 1929.  W. F. CHADBOURNE  1,704,171

CROSS CHAIN CLIP

Filed March 2, 1928

INVENTOR
Weston F. Chadbourne
by H. W. Kenway Atty

Patented Mar. 5, 1929.

1,704,171

UNITED STATES PATENT OFFICE.

WESTON F. CHADBOURNE, OF FRANKLIN, MASSACHUSETTS.

CROSS-CHAIN CLIP.

Application filed March 2, 1928. Serial No. 258,468.

This invention relates to anti-skid chains for use upon the wheels of motor vehicles. Its object is to provide a spring clip for use in connection with cross chains so that the latter may be readily replaced when worn or broken, without the necessity of the special tools which are now provided for that purpose.

It is the practice to harden the links of cross chains in order to increase their wear and, consequently, the opening and closing of the hook end of the link is a troublesome operation, particularly upon the road where special tools may not be available. In accordance with the present invention, it is proposed to leave the hook portion of the end links of the cross chain open so that they may be slipped over the links of the side chains, and to provide a clip which may be sprung upon the hook link and which, in use, will serve to close the opening thereof and retain the cross chain in place.

Attempts have been made heretofore to weld spring clips permanently in place upon hook links or to mount clips upon the bill portion of hook links. Neither of these expedients has proved of practical value and as distinguished therefrom, the present invention contemplates a spring clip curved at its longitudinal edges so that it may be sprung upon the body portion of the hook link and maintained in place by its resilient engagement with the sides of the link.

In one aspect, therefore, the invention consists in an integral one-piece clip fashioned of spring sheet material and so constructed and shaped as to maintain its position upon the hook link by resilient engagement. The advantages of such a clip, constituting an integral, self-contained device with no loose parts to become lost or disconnected, are obvious. Moreover, the clip of my invention may be easily and quickly attached and may be relied upon to stay in place under the most exacting conditions of use, as when the brake is locked and the wheel with the cross chain dragged upon the ground. Further, the clip may be removed from the cross chain and used with new chains, an advantage which would be lost if the clip were made a permanent part of the cross chain.

The clip of my invention has the further advantage of economical manufacture and may be produced with advantage from a flat blank punched from sheet metal. The invention, therefore, includes within its scope a novel form of blank herein shown as used in producing the clip.

These and other features of the invention will be best understood and appreciated from the following description of a preferred embodiment thereof, selected for purposes of illustration and shown in the accompanying drawings, in which Fig. 1 is a view in elevation of a portion of a cross chain equipped with the clip of my invention and shown as connected to a side chain;

Figure 1:
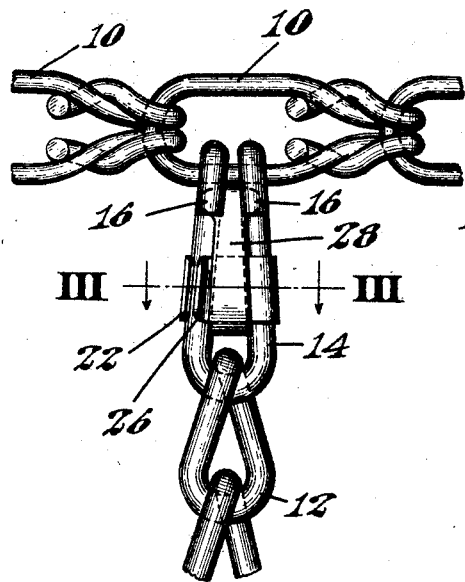
Figures 2, 3:
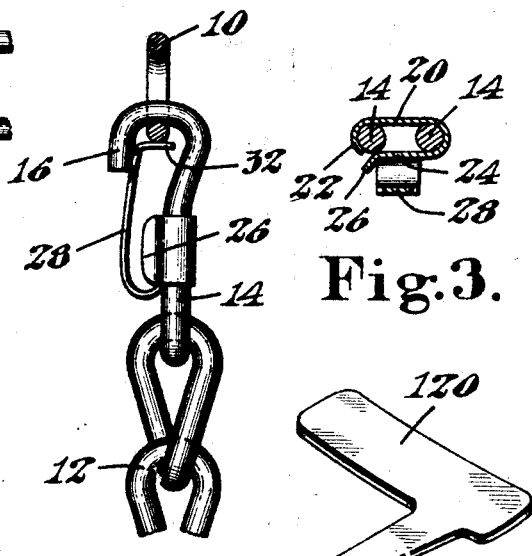
Fig. 2 is a similar view in side elevation.
Fig. 3 is a view in cross section on the line 3—3 of Fig. 1.

The cross chain comprises the intermediate links 12 and has at each end a coupling or connecting hook link 14, the sides of which converge slightly toward the hook or bill end comprising the upturned end 16. The side chains comprise the links 10 between which the cross chains extend at regular spacing. As herein shown, the hook of the connecting link is left open sufficiently to receive one part of the side chain link 10 and the clip of my invention serves to prevent disengagement of the hook from the side chain.

Figure 5:
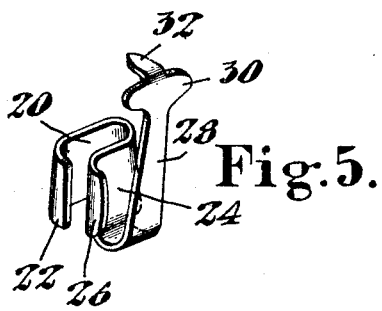
Fig. 5 is a view in perspective of the clip.

The construction of the clip is best shown in Fig. 5. It constitutes an integral sheet metal structure, fashioned from a flat blank of sheet material. The body portion 20 of the clip is curved upwardly at its longitudinal edges to embrace the sides of the link 14 and said upturned curved portions converge to correspond to the convergence of the sides of the hook link 14. The upturned curved edge 22 extends about the side of the link 14 to a point sufficient to prevent accidental disengagement thereof, or nearly 180 degrees. This feature is of importance because if the curved edge 22 were made substantially shallower or embraced the link about only 90 degrees of its circumference, the clip would be likely to be disengaged whenever the cross chain happened to be dragged on the ground.

The other edge of the body portion 20 of the clip extends completely around the other side 14 of the hook chain and merges into an upper portion 24 which overlies both sides and terminates in an upwardly curved flange or lip 26. This, as will be apparent, is protected in any usual condition of use but facilitates springing the clip upon the link in that it forms a cooperating diverging surface with the end of the curved edge 22, into the vertex of which the rounded side 14 of the link may be pressed in assembling the clip upon the link.

From the rear edge of the upper portion 24 of the clip extends the integral tongue 28. This tongue is curved upwardly and then extends forwardly over the portion 24 but spaced from the latter, and terminates at its free end in a transversely widened portion 30 and a downwardly projecting tongue 32. The portion 30 of the tongue 28 is widened to correspond to the width of the two sides 16 of the bill of the hook and the downwardly extending tongue 32 is intended to engage the outer side of the link 10 of the side chain, thereby preventing longitudinal displacement of the clip toward the bill of the hook which might otherwise occur on account of the resilient nature of the clip construction. Displacement of the clip in the other direction is prevented by the wedging engagement of the converging side walls of the clip with the converging side walls of the hook link.

It will be apparent that the clip may be assembled upon the hook link of the cross chain by merely springing the portions 20 and 24 apart and that this may be done conveniently by pressing the clip upon the side of the link at the space between the diverging surfaces of the lip 26 and curved edge 22. The clip may be removed from the hook link by a reverse operation and it may be convenient to assist this by inserting a screw driver under the lip 26.

Figure 4:
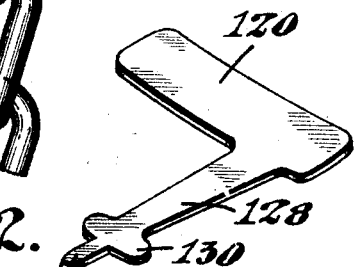
Fig. 4 is a view in perspective of the blank used in producing the clip.

The clip herein described may be produced with good advantage from a flat blank such as that shown in Fig. 4. This comprises a flat body portion 120 with rounded corners, having an elongated tongue 128 projecting from one edge thereof at a point near one end. The tongue 128 is widened transversely at 130 near its free end and terminates in a reduced pointed tongue 132. In constructing the clip, the flat body portion 120 is bent to form the body portion 20, the curved edge 22, the overlying portion 24 and the upstanding lip 26 of the clip. The flat tongue 128 is curved upwardly and over the body portion of the clip forming the tongue 28, and the terminal tongue 132 is bent down to form a tongue 32 of the completed clip.

Figure 6:
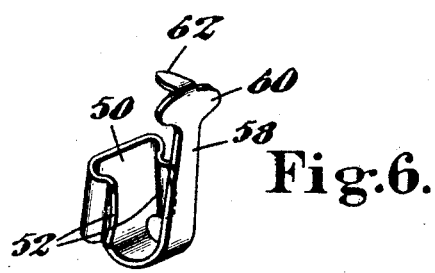
Fig. 6 is a view in perspective of a clip of modified construction.

A clip of modified construction is shown in Fig. 6. This differs from that already described principally in that the tongue extends from the lower or body portion of the clip instead of from the upper overlying portion thereof. Referring to Fig. 6, the body portion 50 of the clip is provided with upstanding curved edges 52 of similar and symmetrical shape, which are intended to embrace the sides 14 of the hook link. The rear edge of the body portion 50 merges into the tongue 58 which extends upwardly between the sides 14 of the hook link and forwardly into engagement with the under side of the bill 16 of the hook link. The clip shown in Fig. 6 possesses the same advantages of easy attachment to the cross chain and permits the same ready attachment and disengagement of the cross chain so equipped from the side chain.

It will be apparent that the clip herein shown may be used with any cross chain where the bill of the hook link is left open. It is not necessary, therefore, that all cross chains should be equipped with the clip for the latter may be assembled whenever required and upon any cross chain of which service is desired. In disengaging a cross chain, it will be understood that the tongue 28 is merely depressed sufficiently to permit the bar of the side chain 10 to be passed out under the bill of the hook and in this depression of the tongue 28, the reduced terminal tongue 32 passes downwardly into the space between the sides 14 of the hook link.

Having thus described my invention, what I claim as new and desire to secure by Letters Patent is:

1. A detachable cross chain clip, comprising an integral sheet metal structure having a body portion with converging curved longitudinal edges for resiliently embracing the converging sides of a hook link and thereby preventing longitudinal displacement of the clip on the hook, and a resilient tongue projecting from the rear edge of the body portion upwardly and forwardly into engagement with the inner side of the bill of the link.

2. A cross chain clip for a hook link, comprising an integral sheet metal structure having a body portion with curved longitudinal edges for resiliently embracing the sides of the hook link, a resilient tongue projecting forwardly into proximity to the bill of the hook and having a transversely widened end with a down-turned projection adapted to engage a link within the hook.

3. A cross chain clip for a hook link, comprising an integral sheet metal structure having upper and lower spring members, one having an inwardly curved edge for embracing one side of the hook link and the other having a diverging lip, said curved edge and lip acting to guide the clip into place upon the link in assembling the two.

4. A cross chain clip for a hook link, comprising an integral sheet metal structure having a body portion with curved edges for resiliently embracing the sides of a hook link, one edge extending more than 90 degrees about one side of the hook, and the edge enclosing the other side of the hook and merging into an upper overlying portion, and a resilient tongue projecting upwardly and forwardly from the rear edge of said overlying portion.

5. A detachable cross chain clip for a hook line, comprising upper and lower portions spaced to receive between them both sides of a double hook link, connected by a curved resilient section at one side and having at the other side an opening through which the hook may be forced in detaching the clip, and a tongue projecting from the rear edge of one of said portions forwardly into proximity to the bill of the hook.

6. A cross chain clip for a hook link, comprising a body having upper and lower portions spaced to receive between them the sides of a double hook link, being connected at one side by a curved resilient section and having divergent surfaces at the other side, and a tongue projecting from the rear edge of one of said portions forwardly into proximity to the bill of the hook link.

7. A sheet metal blank for a cross chain clip, having a rectangular body portion with round corners, an elongated tapering tongue projecting from one edge of the body portion adjacent to but spaced from one end thereof, said tongue being widened near its outer end and terminating in a short tapering projection.

WESTON F. CHADBOURNE.